US008450009B2

(12) United States Patent
Lee

(10) Patent No.: US 8,450,009 B2
(45) Date of Patent: May 28, 2013

(54) CYLINDRICAL LITHIUM ION SECONDARY BATTERY

(75) Inventor: Myungro Lee, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 405 days.

(21) Appl. No.: 12/789,807

(22) Filed: May 28, 2010

(65) Prior Publication Data

US 2010/0310925 A1 Dec. 9, 2010

(30) Foreign Application Priority Data

Jun. 8, 2009 (KR) ........................ 10-2009-0050407

(51) Int. Cl.
*H01M 2/02* (2006.01)
*H01M 6/08* (2006.01)

(52) U.S. Cl.
USPC .......................................................... 429/164

(58) Field of Classification Search
USPC .......................................................... 429/164
See application file for complete search history.

(56) References Cited

U.S. PATENT DOCUMENTS

2007/0231679 A1 10/2007 Chang et al.
2008/0096107 A1 4/2008 Shimozono et al.
2008/0226981 A1 9/2008 Yoon
2008/0241646 A1* 10/2008 Sawa et al. ...................... 429/94
2011/0081565 A1* 4/2011 Kang ............................. 429/94

FOREIGN PATENT DOCUMENTS

| | | | |
|---|---|---|---|
| JP | 10-208724 A | | 8/1998 |
| JP | 2008-91118 A | | 4/2008 |
| KR | 10-2006-0037842 A | | 5/2006 |
| KR | 10-2007-0071243 A | | 7/2007 |
| KR | 10-2007-0097855 A | | 10/2007 |
| KR | 10-2008-0032911 A | * | 4/2008 |
| KR | 10-2008-0032911 A | | 4/2008 |
| KR | 10-2008-0084450 A | | 9/2008 |

OTHER PUBLICATIONS

Korean Notice of Allowance dated Sep. 23, 2011 for Korean Patent Application No. KR 10-2009-0050407 which corresponds to captioned U.S. Appl. No. 12/789,807.

Korean Office Action dated Jan. 14, 2011 for Korean Patent Application No. KR 10-2009-0050407 which corresponds to the captioned application.

* cited by examiner

*Primary Examiner* — Carlos Barcena
(74) *Attorney, Agent, or Firm* — Knobbe, Martens, Olson & Bear LLP

(57) ABSTRACT

A cylindrical lithium ion secondary battery including a center pin that has a diameter greater than a diameter of a hole formed in the center of an insulating plate to reduce the noise generated by contacting the center pin with the bottom surface of the cylindrical can.

15 Claims, 6 Drawing Sheets

155
154
153
152
151
137
138
140
135
130
120
110

FIC.2B

CYLINDRICAL LITHIUM ION SECONDARY BATTERY

CROSS-REFERENCE TO RELATED APPLICATION

This application claims priority to and the benefit of Korean Patent Application No. 10-2009-0050407, filed on Jun. 8, 2009 in the Korean Intellectual Property Office, the disclosure of which is incorporated herein in its entirety by reference.

BACKGROUND OF THE INVENTION

1. Field of the Invention

Aspects of the present invention relate to a cylindrical lithium ion secondary battery.

2. Description of the Related Art

Generally, as portable wireless devices (such as video cameras, mobile phones, and portable computers) are made more lightweight and functional, secondary batteries used as their driving power sources are being actively developed. Such secondary batteries include nickel-cadmium batteries, nickel-hydrogen batteries, nickel-zinc batteries, and lithium ion secondary batteries.

Among these, lithium ion secondary batteries may be rechargeable, miniaturized, and have a maximized capacity. Thus, lithium ion secondary batteries are widely used in high tech electronic devices because they have a high operating voltage and a high energy density per unit weight.

SUMMARY OF THE INVENTION

According to an aspect of the present invention, there is provided a cylindrical lithium ion secondary battery, including: a cylindrical can; a first insulating plate through which a first hole is formed in a center thereof, the first insulating plate being coupled to the cylindrical can; an electrode assembly disposed on the first insulating plate, the electrode assembly being coupled to the cylindrical can; a center pin coupled to the electrode assembly; and a cap assembly sealing the cylindrical can, wherein a diameter of the center pin is greater than a diameter of the first hole.

The first insulating plate may include a plurality of second holes along an outer circumference of the first hole.

The cylindrical lithium ion secondary battery may include a second insulating plate having a plate shape and disposed between the electrode assembly and the cap assembly.

The second insulating plate may further include a third hole, and the diameter of the center pin may be greater than a diameter of the third hole.

The electrode assembly may include a negative electrode plate, a positive electrode plate, and a separator, and the center pin may have a length less than a length of the separator and greater than a length of the negative electrode plate.

The center pin may be spaced apart from the first insulating plate.

The center pin may contact the first insulating plate.

The center pin may be spaced apart from the second insulating plate.

The center pin may contact the second insulating plate.

According to another aspect of the present invention, there is provided an insulating plate of a cylindrical lithium ion secondary battery having a cylindrical can, an electrode assembly coupled to the cylindrical can, a cap assembly sealing the cylindrical can, and a center pin coupled to the electrode assembly, the insulating plate including: a center portion having a first hole formed therethrough, wherein a diameter of the first hole is less than a diameter of the center pin.

According to another aspect of the present invention, there is provided a center pin of a cylindrical lithium ion secondary battery having a cylindrical can, an electrode assembly including a separator, a positive electrode plate, and a negative electrode plate, and coupled to the cylindrical can, a cap assembly sealing the cylindrical can, a first insulating plate located between a bottom surface of the cylindrical can and the electrode assembly, and a second insulating plate located between the electrode assembly and the cap assembly, the center pin including: a cylindrical body coupled to electrode assembly, wherein a diameter of the cylindrical body is greater than a diameter of a first hole formed through a center of the first insulating plate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2A and 2B illustrate exploded cross-sectional views of respective lower and upper regions of a cylindrical lithium ion secondary battery according to an embodiment of the present invention;

DETAILED DESCRIPTION OF THE EMBODIMENTS

Figure 1A:
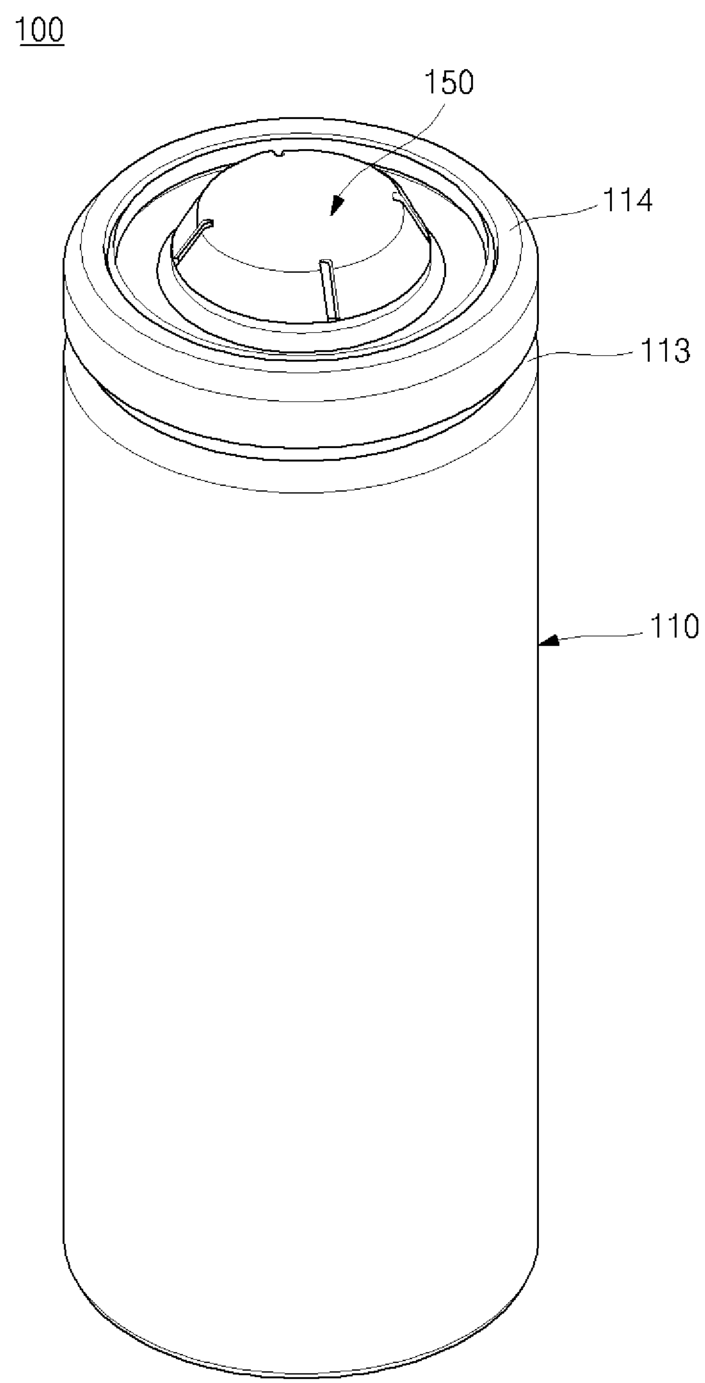
FIGS. 1A, 1B, and 1C illustrate a perspective view, a cross-sectional view, and an exploded perspective view, respectively, of a cylindrical lithium ion secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
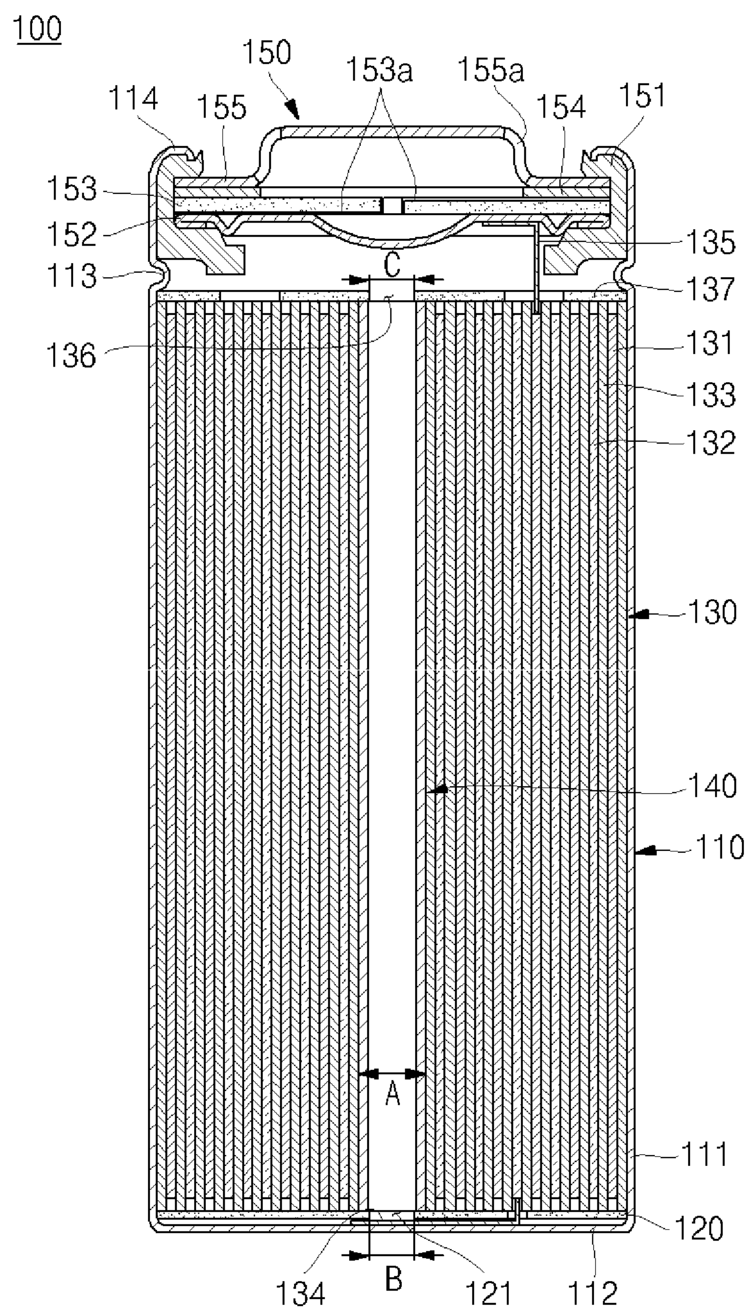
Figure 1C:
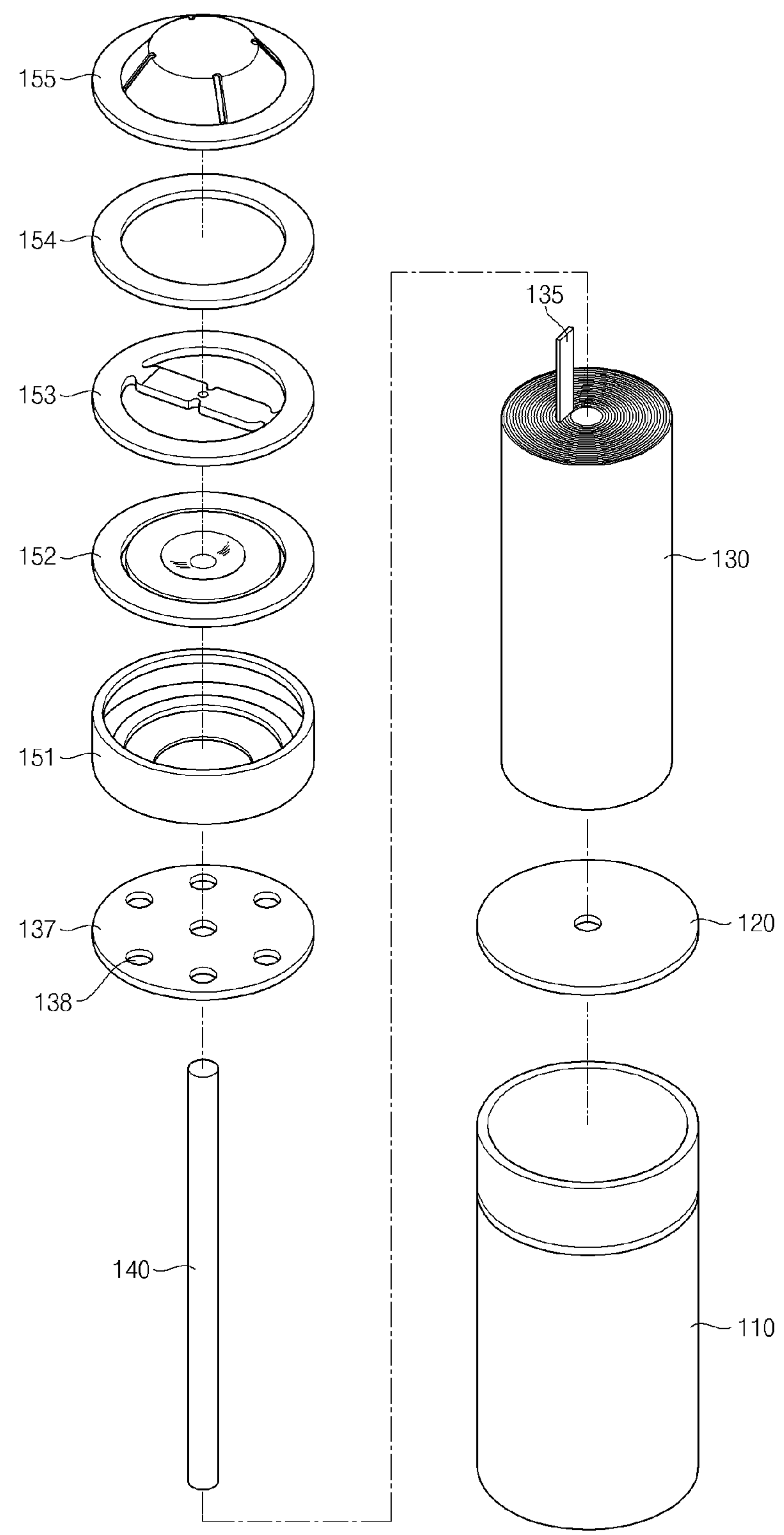

FIGS. 1A, 1B, and 1C illustrate a perspective view, a cross-sectional view, and an exploded perspective view, respectively, of a cylindrical lithium ion secondary battery 100 according to an embodiment of the present invention. Referring to FIGS. 1A to 1C, the cylindrical lithium ion secondary battery 100 includes a cylindrical can 110, a first insulating plate 120, an electrode assembly 130, a center pin 140, and a cap assembly 150. The first insulating plate 120 is coupled to the cylindrical can 110. A first hole 121 is formed through a center of the first insulating plate 120. The electrode assembly 130 is coupled to the cylindrical can 110 and disposed on the first insulating plate 120. The center pin 140 is coupled to the electrode assembly 130. The cap assembly 150 seals the cylindrical can 110.

The cylindrical can 110 has a cylindrical surface 111 having an approximately cylindrical shape and a certain diameter. A bottom surface 112 having an approximately circular plate shape is disposed on a lower portion of the cylindrical surface 111. The cylindrical surface 111 has an opened upper portion. Thus, the electrode assembly 130 and the center pin 140 may be directly inserted through an upper portion of the cylindrical can 110 toward a lower portion. The cylindrical can 110 may be formed of steel, stainless steel, aluminum, or equivalents thereof, though it is understood that aspects of the present invention are not limited thereto. A negative electrode tab 134 of the electrode assembly 130 may be welded to the bottom surface 112 of the cylindrical can 110. Thus, the cylindrical can 110 may act as a negative electrode. However, it is understood that aspects of the present invention are not limited thereto. For example, according to other aspects, a positive electrode tab 135 may be welded to the bottom surface 112 of the cylindrical can 110. In this case, the cylindrical can 110 may act as a positive electrode.

The first insulating plate 120 is coupled to the cylindrical can 110, and the first hole 121 is located at the center of the first insulating plate 120. Furthermore, the first insulating plate 120 contacts a bottom surface of the electrode assembly 130 to prevent the electrode assembly 130 from being electrically short-circuited to the bottom surface 112 of the cylindrical can 110. The exterior of the first insulating plate 120 is circular and plate-shaped.

The electrode assembly 130 is coupled to the cylindrical can 110 and disposed on the first insulating plate 120. The electrode assembly 130 includes a negative electrode plate 131 coated with negative electrode active materials (e.g., graphite, carbon, etc.), a positive electrode plate 132 coated with positive electrode active materials (e.g., transition-metal oxides such as LithiumCobaltDioxide, LithiumNickelDioxide, LithiumManganicDioxide, etc.), and a separator 133 disposed between the negative electrode plate 131 and the positive electrode plate 132 to prevent a short circuit therebetween and to move lithium ions. The negative electrode plate 131, the positive electrode plate 132, and the separator 133 are wound in an approximately cylindrical shape and received into the cylindrical can 110. The negative electrode plate 131 may include a copper foil, the positive electrode plate 132 may include an aluminum foil, and the separator 133 may be formed of polyethylene (PE) or polypropylene (PP). However, it is understood that aspects of the present invention are not limited thereto. A negative electrode tab 134 extending downward by a certain length may be welded to the negative electrode plate 131, and a positive electrode tab 135 extending upward by a certain length may be welded to the positive electrode plate 132. However, it is understood that according to other aspects, the negative electrode tab 134 may extend upward by the certain length, and the positive electrode tab 134 may extend downward by the certain length. The negative electrode tab 134 may be formed of nickel, and the positive electrode tab 135 may be formed of aluminum, though aspects of the present invention are not limited thereto.

The center pin 140 is coupled to an approximately central portion of the electrode assembly 130. The center pin 140 suppresses deformation of the electrode assembly 130 when the cylindrical lithium ion secondary battery 100 is charged or discharged. Furthermore, the center pin 140 has an approximately cylindrical shape with a hollow interior. The center pin 140 may be formed of a metallic material (such as steel using stainless (SUS), etc.), or an insulating material (such as polybutylene terephtalate (PBT), etc.). A second insulating plate 137 in which a third hole 136 is located is disposed on top surfaces of the electrode assembly 130 and the center pin 140. A plurality of electrolyte injection holes 138 is formed along the outer circumference of the third hole 136. The electrolyte injection holes 138 provide passages through which an electrolyte is injected into the electrode assembly 130. The second insulating plate 137 prevents the electrode assembly 130 and the cap assembly 150 from contacting each other. That is, the second insulating plate 137 prevents the center pin 140 and a safety vent 152 from contacting each other when the cylindrical lithium ion secondary battery 100 is shaken due to an external impact. Thus, the center pin 140 may prevent the safety vent 152 from being deformed.

The center pin 140 has a diameter A greater than a diameter B of the first hole 121 and a diameter C of the third hole 136. Thus, the center pin 140 does not pass through the first hole 121 and the third hole 136. That is, since the center pin 140 has the diameter A greater than the diameter B of the first hole 121, the center pin 140 does not contact the bottom surface 112 of the cylindrical can 110. Accordingly, it is possible to reduce a noise that may be generated in the cylindrical lithium ion secondary battery 100. Similarly, since the center pin 140 has the diameter A greater than the diameter C of the third hole 136, the center pin 140 does not contact the safety vent 152.

The center pin 140 has a length less than that of the separator 133 and greater than that of the negative electrode plate 131 and/or the positive electrode plate 132. If the center pin 140 has a length greater than that of the separator 133, a gas flow passage within the cylindrical lithium ion secondary battery 100 is blocked to prevent gas from being easily exhausted. Thus, the center pin 140 does not act as the gas flow passage. Also, if the center pin 140 has a length less than that of the negative electrode plate 131 and the positive electrode plate 132, a region in which the negative electrode plate 131 and the positive electrode plate 132 contact each other is reduced. Thus, since a region to fix the electrode assembly 130 is reduced, deformation of the electrode assembly 130 may easily occur. That is, if the center pin 140 has a length less than that of the negative electrode plate 131 and the positive electrode plate 132, the center pin 140 may not prevent the electrode assembly 130 from being deformed.

An insulative gasket 151 having an approximately ring shape is coupled to an upper region of the cylindrical can 110 (i.e., upper regions of the electrode assembly 130 and the center pin 140), and the conductive safety vent 152 is coupled to the insulative gasket 151 to form the cap assembly 150. Here, the positive electrode tab 135 may be connected to the safety vent 152. According to other aspects, the negative electrode tab 134 may be connected to the safety vent 152. As is generally known in the art, the safety vent 152 may deform or rupture when the internal pressure of the cylindrical can 110 increases beyond a certain level to damage a circuit module 153 (to be described later), or may exhaust gas to the outside. The circuit module 153 is further disposed on an upper portion of the safety vent 152, and is damaged or broken when the safety vent 152 is deformed, interrupting flow of electric current. A positive temperature coefficient (PTC) device 154 to interrupt over-current flow is disposed on the circuit module 153. A conductive positive cap 155 (or negative cap), in which a plurality of through holes **155*a* is formed to easily exhaust gas, providing a positive voltage (or negative voltage) to the outside, is further disposed on the PTC device 154. Since the safety vent 152, the circuit module 153, the PTC device 154, and the positive cap 155 are installed inside the insulative gasket 151, the safety vent 152, the circuit module 153, the PTC device 154, and the positive cap 155 may be prevented from being directly short-circuited to the cylindrical can 110. In addition, a wiring pattern 153***a* is disposed on the circuit module 153 to be automatically disconnected if the circuit module 153 is damaged or broken.

The cylindrical can 110 includes an inwardly indented beading part 113 below the cap assembly 150 to prevent the cap assembly 150 from being separated to from the cylindrical can 110. The cylindrical can 110 further includes an inwardly bent crimping part 114 above the cap assembly 150. The beading part 113 and the crimping part 114 firmly fix and support the cap assembly 150 to the cylindrical can 110. In addition, the beading part 113 and the crimping part 114 prevent electrolytes from leaking to the outside.

An electrolyte (not shown) is injected into the cylindrical can 110. The electrolyte may move lithium ions generated by an electrochemical reaction occurring on the negative electrode plate 131 and the positive electrode plate 132 within the cylindrical lithium ion secondary battery 100 during charging and discharging. The electrolyte may include a non-aqueous organic electrolyte, which is a mixture of a lithium salt and a high-purity organic solvent, and a polymer electrolyte, though it is understood that aspects of the present invention are not limited thereto.

Figure 2A:
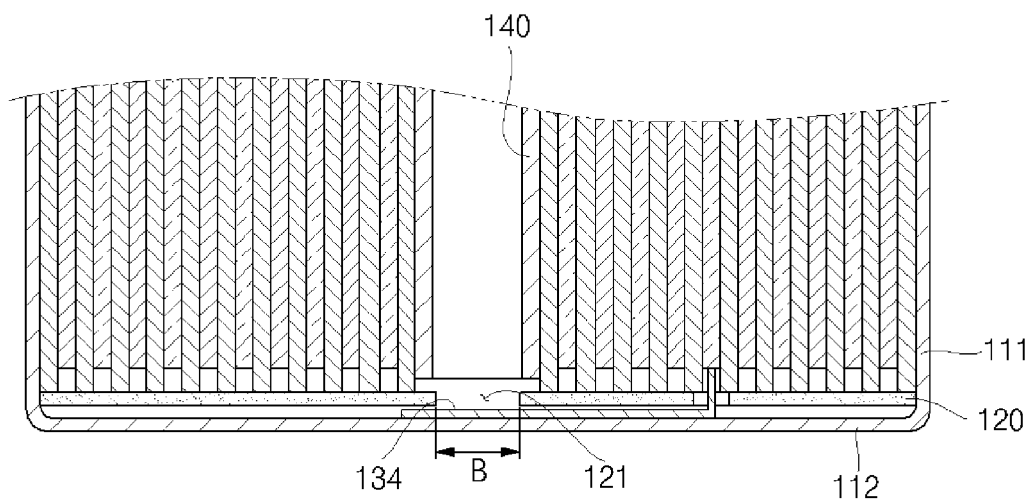
Figure 2A:
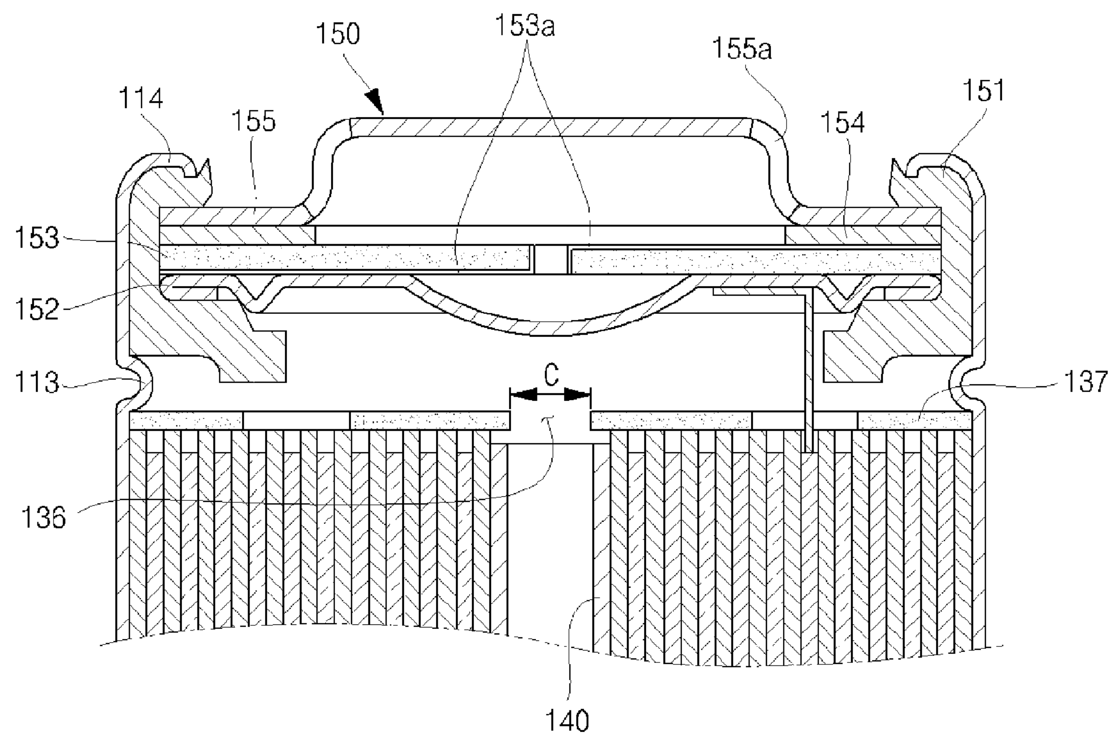

FIGS. 2A and 2B illustrate exploded cross-sectional views of respective lower and upper regions of a cylindrical lithium ion secondary battery 100 according to an embodiment of the present invention. Referring to FIGS. 2A and 2B, a center pin 140 of the cylindrical lithium ion secondary battery 100 may contact a first insulating plate 120 and a second insulating plate 137. That is, a lower portion of the center pin 140 may contact the first insulating plate 120, and an upper portion of the center pin 140 may contact the second insulating plate 137. Thus, the center pin 140 may be in contact with the first insulating plate 120 and the second insulating plate 137 to reduce noise generated from vibration of the center pin 140.

Figure 3A:
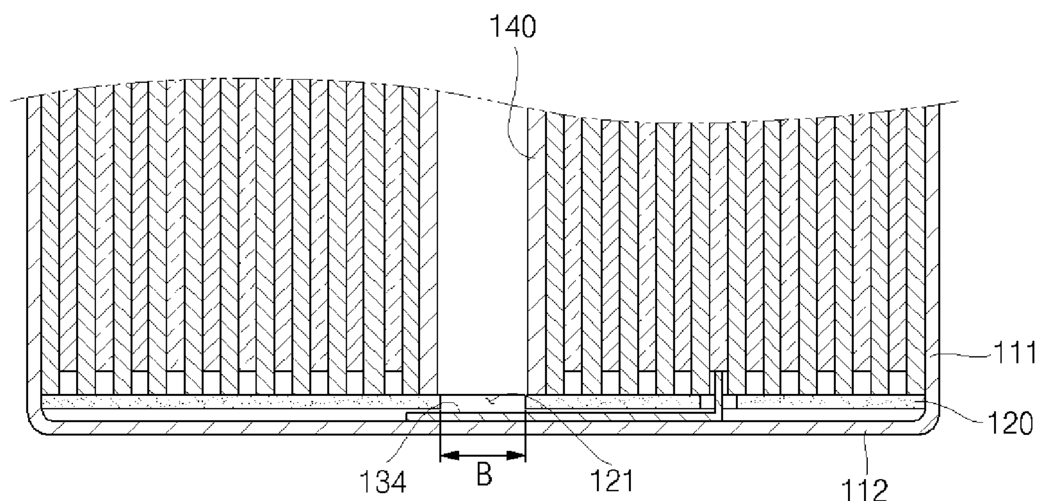
FIGS. 3A and 3B illustrate exploded cross-sectional views of respective lower and upper regions of a cylindrical lithium ion secondary battery according to another embodiment of the present invention.
Figure 3B:
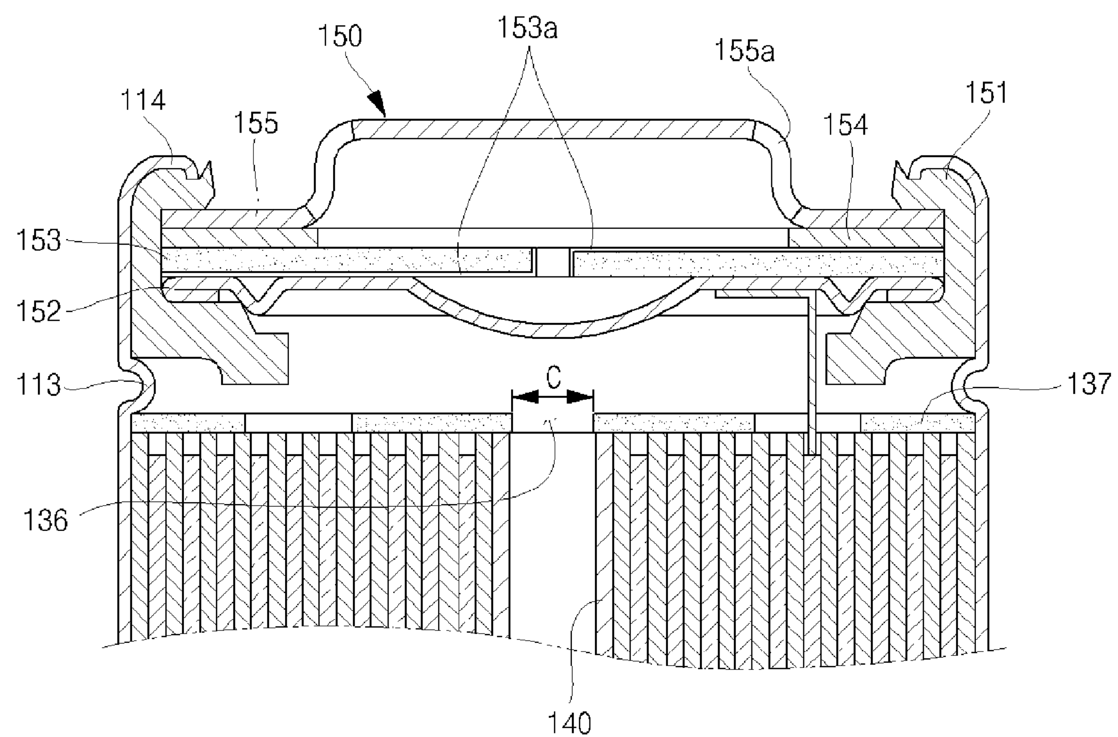

FIGS. 3A and 3B illustrate exploded cross-sectional views of respective lower and upper regions of a cylindrical lithium ion secondary battery 100 according to another embodiment of the present invention. Referring to FIGS. 3A and 3B, a center pin 140 of the cylindrical lithium ion secondary battery 100 may be spaced from a first insulating plate 120 and a second insulating plate 137. That is, a lower portion of the center pin 140 may be spaced from the first insulating plate 120, and an upper portion of the center pin 140 may be spaced from the second insulating plate 137.

Figure 4:
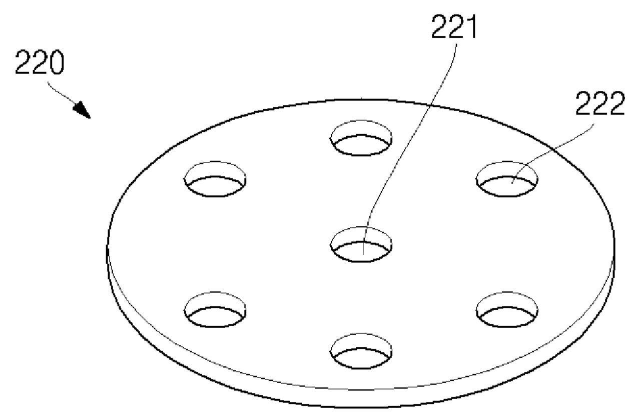
FIG. 4 illustrates a perspective view of a first insulating plate of a cylindrical lithium ion secondary battery according to another embodiment of the present invention.

FIG. 4 illustrates a perspective view of a first insulating plate 220 of a cylindrical lithium ion secondary battery 100 according to another embodiment of the present invention. Referring to FIG. 4, a plurality of second holes 222 may be further formed along the outer circumference of a first hole 221 in the first insulating plate 220 of the cylindrical lithium ion secondary battery 100. At least one or more second holes may be provided to act as a negative electrode tab as well as an electrolyte through-hole. This may prevent a wet-out rate of an electrolyte of an electrode assembly 130 from being reduced when the center pin 140 has a diameter greater than that of the first hole 221. That is to say, when the center pin 140 having a large diameter is inserted into the electrode assembly 130, the electrode assembly 130 is more closely attached to a cylindrical can 110 to compress the electrode assembly 130. Thus, the wet-out rate of the electrolyte of the electrode assembly 130 may be reduced. Therefore, the plurality of second holes 222 is formed along the outer circumference of the first hole 221 to improve the wet-out rate of the electrolyte.

Figure 5:
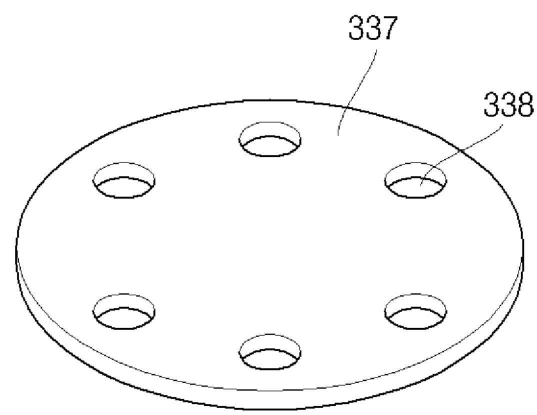
FIG. 5 illustrates a perspective view of a second insulating plate of a cylindrical lithium ion secondary battery according to another embodiment of the present invention.

FIG. 5 illustrates a perspective view of a second insulating plate 337 of a cylindrical lithium ion secondary battery 100 according to another embodiment of the present invention. Referring to FIG. 5, the second insulating plate 337 of the cylindrical lithium ion secondary battery 100 may have a plate shape in which a third hole 221 is not formed in a center thereof. A plurality of electrolyte injection holes 338 is formed along an outer circumference of the second insulating plate 337. Furthermore, a center pin 140 is disposed at a center of a bottom surface of the second insulating plate 337. Here, the center pin 140 may be spaced apart from the second insulating plate 337 or contact the second insulating plate 337.

As described above, according to aspects of the present invention, the cylindrical lithium ion secondary battery 100 includes the center pin 140 that has a diameter greater than that of the hole formed in the center of the insulating plate 120 to reduce the noise generated by contacting the center pin 140 with the bottom surface 112 of the cylindrical can 110.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cylindrical lithium ion secondary battery, comprising:
- a cylindrical can;
- a first insulating plate through which a first hole is formed in a center thereof, the first insulating plate being coupled to the cylindrical can;
- an electrode assembly disposed on the first insulating plate, the electrode assembly being coupled to the cylindrical can;
- a center pin coupled to the electrode assembly; and
- a cap assembly sealing the cylindrical can,
- wherein a diameter of the center pin is greater than a diameter of the first hole, and wherein the first insulating plate is between the electrode assembly and a bottom surface of the cylindrical can.

2. The cylindrical lithium ion secondary battery as claimed in claim 1, wherein the first insulating plate includes a plurality of second holes along an outer circumference of the first hole.

3. The cylindrical lithium ion secondary battery as claimed in claim 1, further comprising a second insulating plate disposed between the electrode assembly and the cap assembly.

4. The cylindrical lithium ion secondary battery as claimed in claim 3, wherein the second insulating plate includes a third hole, and the diameter of the center pin is greater than a diameter of the third hole.

5. The cylindrical lithium ion secondary battery as claimed in claim 4, wherein the center pin is spaced apart from the second insulating plate.

6. The cylindrical lithium ion secondary battery as claimed in claim 4, wherein the center pin contacts the second insulating plate.

7. The cylindrical lithium ion secondary battery as claimed in claim 4, wherein the second insulating plate includes a plurality of electrolyte injection holes formed along an outer circumference thereof.

8. The cylindrical lithium ion secondary battery as claimed in claim 3, wherein the center pin is spaced apart from the second insulating plate.

9. The cylindrical lithium ion secondary battery as claimed in claim 3, wherein the center pin contacts the second insulating plate.

10. The cylindrical lithium ion secondary battery as claimed in claim 3, wherein the second insulating plate includes a plurality of electrolyte injection holes formed along an outer circumference thereof

11. The cylindrical lithium ion secondary battery as claimed in claim 1, wherein the electrode assembly includes a negative electrode plate, a positive electrode plate, and a separator, and the center pin has a length less than a length of the separator and greater than a length of the negative electrode plate.

12. The cylindrical lithium ion secondary battery as claimed in claim 1, wherein the electrode assembly includes a negative electrode plate, a positive electrode plate, and a separator, and the center pin has a length less than a length of the separator and greater than a length of the positive electrode plate.

13. The cylindrical lithium ion secondary battery as claimed in claim 1, wherein the electrode assembly includes a negative electrode plate, a positive electrode plate, and a separator, and the center pin has a length less than a length of the separator.

14. The cylindrical lithium ion secondary battery as claimed in claim 1, wherein the center pin is spaced apart from the first insulating plate.

15. The cylindrical lithium ion secondary battery as claimed in claim 1, wherein the center pin contacts the first insulating plate.

* * * * *